(12) United States Patent
Kokajko et al.

(10) Patent No.: US 12,531,917 B2
(45) Date of Patent: Jan. 20, 2026

(54) CHAT BRIDGING IN VIDEO CONFERENCES

(71) Applicant: Zoom Video Communications, Inc., San Jose, CA (US)

(72) Inventors: Sam Kokajko, Round Rock, TX (US); Jonathan Kokotajlo, Brooklyn, NY (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 17/973,955

(22) Filed: Oct. 26, 2022

(65) Prior Publication Data
US 2024/0146783 A1    May 2, 2024

(51) Int. Cl.
*H04L 65/403*    (2022.01)
*H04L 51/04*    (2022.01)

(52) U.S. Cl.
CPC ............ *H04L 65/403* (2013.01); *H04L 51/04* (2013.01)

(58) Field of Classification Search
CPC ....... H04L 65/403; H04L 51/04; H04L 12/18; H04L 65/1093
See application file for complete search history.

(56) References Cited

U.S. PATENT DOCUMENTS

| | | | |
|---|---|---|---|
| 9,191,615 B1 | 11/2015 | Valimaki et al. | |
| 9,900,280 B2 | 2/2018 | Geppert et al. | |
| 10,536,422 B1 * | 1/2020 | Rao | G06Q 50/01 |
| 10,863,230 B1 | 12/2020 | Pham et al. | |
| 11,055,305 B1 | 7/2021 | Petricek et al. | |
| 11,343,293 B1 | 5/2022 | Slotznick | |
| 11,444,896 B1 * | 9/2022 | Kwon | H04L 51/216 |
| 12,348,574 B2 | 7/2025 | Kokajko et al. | |
| 2003/0039216 A1 * | 2/2003 | Sheldon | H04L 12/1831 370/260 |
| 2004/0039779 A1 * | 2/2004 | Amstrong | H04L 12/1827 709/236 |
| 2006/0077205 A1 | 4/2006 | Guymon et al. | |
| 2010/0223389 A1 * | 9/2010 | Ananthanarayanan | H04M 3/56 709/229 |
| 2011/0279638 A1 | 11/2011 | Periyannan et al. | |
| 2013/0311595 A1 | 11/2013 | Milatinovici et al. | |
| 2014/0067842 A1 | 3/2014 | Chen et al. | |

(Continued)

OTHER PUBLICATIONS

U.S. Appl. No. 17/973,959, "Non-Final Office Action", dated Nov. 3, 2023, 37 pages.

(Continued)

*Primary Examiner* — William G Trost, IV
*Assistant Examiner* — Adam A Cooney
(74) *Attorney, Agent, or Firm* — Kilpatrick Townsend & Stockton LLP

(57) ABSTRACT

Techniques for bridging messaging channels of virtual conferences are disclosed. In an example, a method involves receiving, from a first client participating as a first virtual participant in a first virtual meeting of a set of virtual meetings hosted by a virtual conference provider. The method further involves identifying, in the first messaging channel, the message for cross-posting. The method further involves transmitting, to a second client participating as a second virtual participant in a second virtual meeting of the set of virtual meetings, an instruction to post the message to a second messaging channel using an identity of the first participant.

18 Claims, 8 Drawing Sheets

(56) References Cited

U.S. PATENT DOCUMENTS

| | | | |
|---|---|---|---|
| 2014/0136999 A1 | 5/2014 | Leibovich et al. | |
| 2014/0278367 A1 | 9/2014 | Markman et al. | |
| 2015/0074555 A1 | 3/2015 | Yoon et al. | |
| 2016/0021039 A1* | 1/2016 | Woo | H04L 51/226 |
| | | | 715/752 |
| 2016/0134568 A1 | 5/2016 | Woo et al. | |
| 2016/0269504 A1 | 9/2016 | Johar et al. | |
| 2016/0315900 A1* | 10/2016 | Rowny | H04L 45/24 |
| 2017/0195631 A1 | 7/2017 | Cahill et al. | |
| 2017/0324624 A1 | 11/2017 | Taine et al. | |
| 2018/0018079 A1 | 1/2018 | Monastyrshyn et al. | |
| 2018/0131878 A1 | 5/2018 | Charlton et al. | |
| 2018/0165520 A1 | 6/2018 | Meisser et al. | |
| 2018/0255007 A1 | 9/2018 | Ji et al. | |
| 2019/0089657 A1* | 3/2019 | Girishankar | H04L 51/02 |
| 2019/0379712 A1 | 12/2019 | Mota et al. | |
| 2020/0007477 A1 | 1/2020 | Nair | |
| 2020/0153915 A1 | 5/2020 | Jain et al. | |
| 2020/0186576 A1 | 6/2020 | Gopal et al. | |
| 2020/0252442 A1* | 8/2020 | Brown | H04L 12/1818 |
| 2020/0259779 A1* | 8/2020 | Liu | H04L 51/10 |
| 2020/0412671 A1 | 12/2020 | Mathur et al. | |
| 2021/0336911 A1* | 10/2021 | Naoi | H04L 51/066 |
| 2021/0390144 A1 | 12/2021 | B M S et al. | |
| 2021/0399911 A1 | 12/2021 | Jorasch et al. | |
| 2022/0030196 A1 | 1/2022 | Cahill et al. | |
| 2022/0166953 A1 | 5/2022 | Aher et al. | |
| 2022/0286314 A1 | 9/2022 | Meyer et al. | |
| 2023/0061720 A1* | 3/2023 | Marzorati | H04L 51/04 |
| 2023/0246857 A1 | 8/2023 | Boucheron et al. | |
| 2023/0318999 A1 | 10/2023 | Lecesne et al. | |
| 2023/0328203 A1 | 10/2023 | Chen et al. | |
| 2024/0283672 A1* | 8/2024 | Kalinichenko | H04L 65/403 |

OTHER PUBLICATIONS

U.S. Appl. No. 17/973,959, "Final Office Action", May 6, 2024, 42 pages.

U.S. Appl. No. 17/973,959, "Non-Final Office Action", Sep. 3, 2024, 40 pages.

U.S. Appl. No. 17/973,959, "Notice of Allowance", Mar. 4, 2025, 24 pages.

* cited by examiner

CHAT BRIDGING IN VIDEO CONFERENCES

FIELD

This disclosure generally relates to video conferencing. More specifically, but not by way of limitation, this disclosure relates to bridging messaging channels of video conferencing sessions.

DETAILED DESCRIPTION

Figure 1:
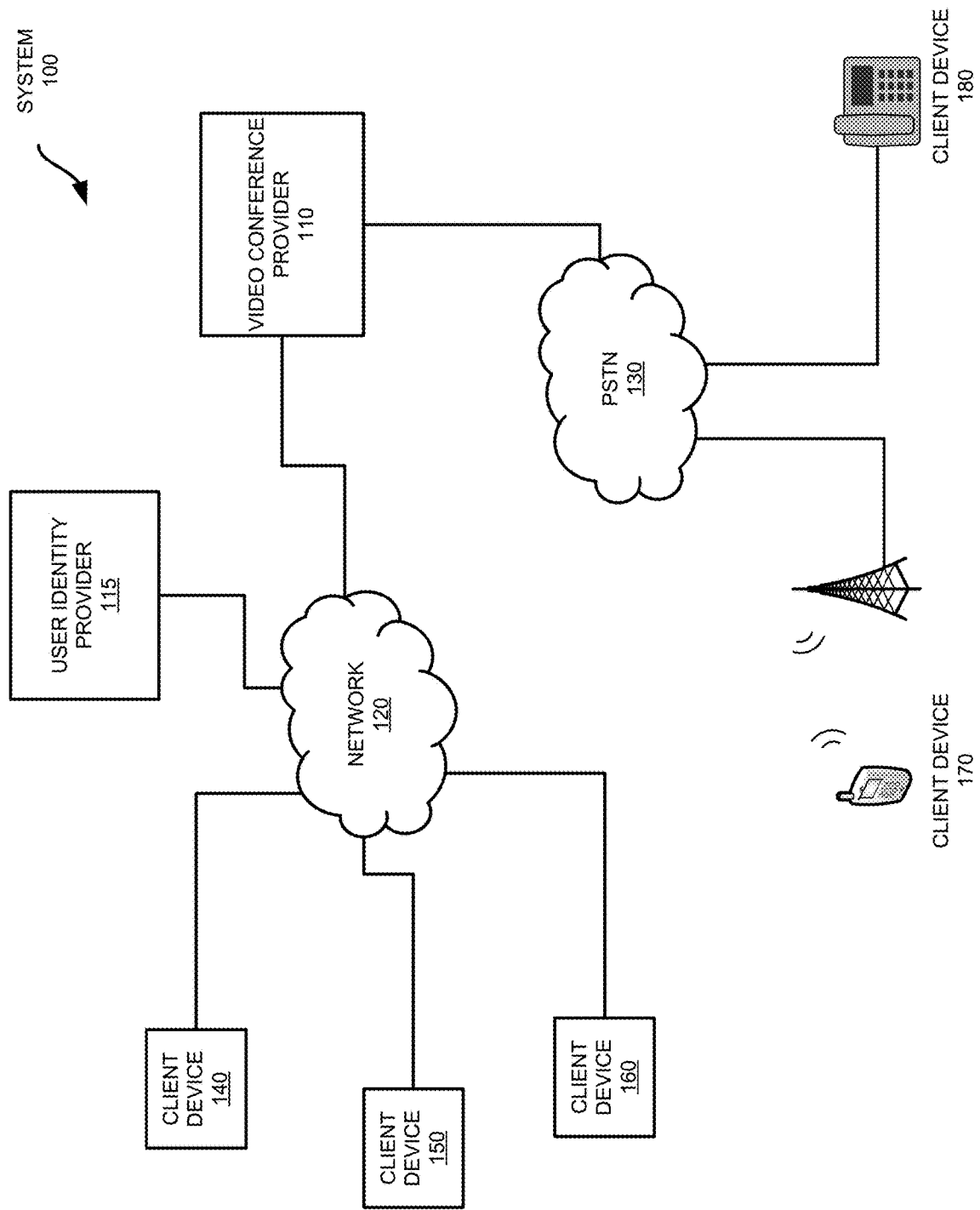
FIG. 1 depicts an example system for providing videoconferencing functionality to client devices.

Disclosed techniques relate to bridging messaging channels of video conferencing sessions. Bridging messaging channels can involve cross-posting messages between the messaging channels of separate video conferencing sessions such that users can communicate with each other as if the sessions were one. In some cases, bridging messaging channels can involve filtering or selecting messages for cross-posting.

Organizations hosting virtual or hybrid meetings may choose to host two or more simultaneous related meetings rather than one larger meeting. Advantages to this approach include maintaining a number of users in any particular session to a minimum, separating on site and remote attendees into different sessions, establishing different sessions for different dispersed offices, and for potential capacity issues at the video conference provider, including managing bandwidth usage or maximum numbers of participants in a particular session. For example, an organization may use a first video conferencing session for on-site attendees and panelists and a second session for remote attendees. But while hosting separate meetings confers advantages, the separate meetings can isolate attendees from being able to communicate with each other via messaging channels. Disclosed techniques address these concerns while maintaining the advantages of separately hosted video conferencing sessions.

To help people feel more connected across the dispersed meetings, chat messages sent by participants in the different meetings can be aggregated and provided to each of the meetings. That way, the participants feel more like they are all participating in the same meeting. The participants can see and participate in conversations with anyone in any of the meetings, such as interact with panelists or presenters in a different meeting or engage with discussions being held in a different meeting. By bridging the chat experience between the different meetings, the participants can feel more connected.

In a simplified example introduced for discussion purposes, to provide chat bridging, the video conference provider runs video conference client software sessions, referred to as "listeners" or "agents," that will connect with the different meetings and obtain chat messages from those meetings. The agents then provide those messages to a bridging application, which performs some intermediate processing on those chat messages, such as filtering, before sending messages to the various listeners in different meetings to be posted in those meetings chat sessions on behalf of the person who originally posted the chat message. Thus, chat messages can flow from one meeting to another and appear to participants in the other meeting. For example, a first listener, or agent, joins a first conferencing session to identify a message from a conference participant. A bridging application, which executes on a local device or a remotely-hosted server, receives the identified message, optionally filters the message, and transmits the message to a second agent that has joined a second meeting. The second agent posts the message in the messaging channel of the second meeting. This process can continue back and forth between the messaging channels. Additional functionality of the bridging application can include profanity filtering, length filtering, and updating an identity of an agent such that the agent appears as a conference participant.

Turning now to the Figures, FIG. 1 depicts an example system 100 for providing videoconferencing functionality to client devices. In the example depicted by system 100, video conference provider 110 hosts one or more video conferences between client devices 140-180. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Other configurations include a hybrid model in which a video conference provider 110 may supply components to enable a private organization to host private internal video conferences or to connect its system to the video conference provider 110 over a public network.

System 100 optionally includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
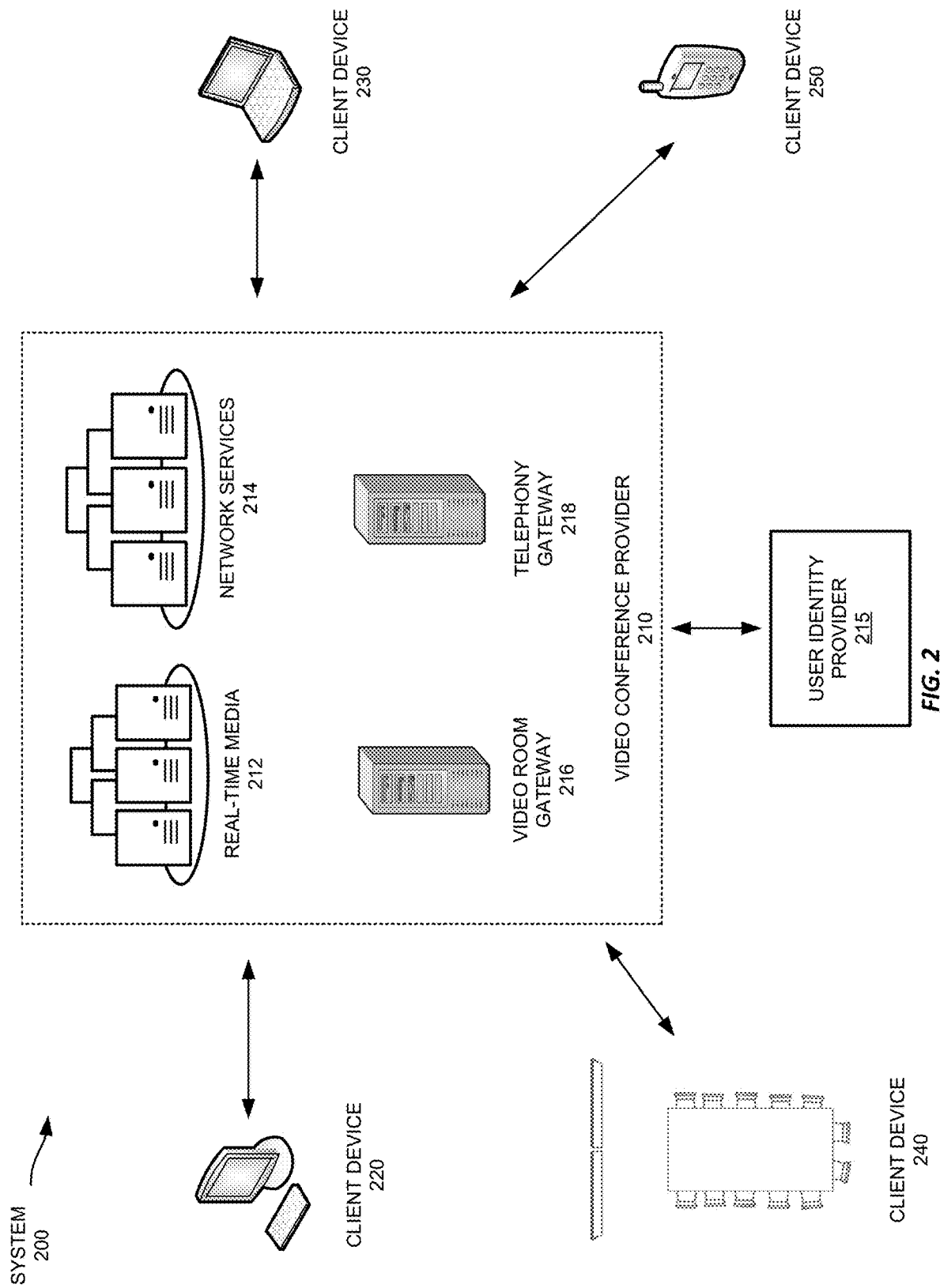
FIG. 2 depicts an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, generating summaries and translations from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings facilitated by video conference provider 110 are provided in virtual rooms to which participants are connected. A room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "a sidebar meeting." A sidebar meeting as provided herein may be a "room" that is associated with a "main" videoconference room or "main meeting."

To create a meeting with the video conference provider 110, a user may contact the video conference provider 110 using a client device 140-180 and select an option to create a new meeting. Such an option may be provided in a webpage accessed by a client device 140-180 or client application executed by a client device 140-180. For telephony devices, the user may be presented with an audio menu that they may navigate by pressing numeric buttons on their telephony device.

To create a meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140-180 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as communication network 120 or the public switched telephone network ("PSTN") 130. The client devices 140-180 may be any suitable computing or communications device that have audio or video capability. For example, client devices 140-180 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Client devices 140-160 contact the video conference provider 110 using communication network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text messaging with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

FIG. 2 depicts an example system 200 in which a video conference provider 210 provides videoconferencing functionality to various client devices 220-250. The client devices 220-250 include two conventional computing devices 220-230, dedicated equipment for a video conference room 240, and a telephony device 250.

Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs different servers (or groups of servers) to provide video conference functionality. The video conference provider 210 uses one or more real-time media servers 212, one or more network services servers 214, one or more video room gateway servers 216, and one or more telephony gateway servers 218. Each of these servers 212-218 is connected to one or more communications networks to enable them to collectively provide access to and participation in one or more video conference meetings to the client devices 220-250.

Real-time media servers 212 provide multiplexed multimedia streams to meeting participants, such as client devices 220-250. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex the video from client device 220 and audio feeds when transmitting streams to client device 220. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services servers 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services servers 214 may accept requests to join the meeting from various users.

To handle requests to join a meeting, the network services servers 214 may receive meeting information, such as a meeting ID and passcode, from one or more client devices 220-250. The network services servers 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services servers 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services servers 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services servers 214.

After joining a meeting, client devices will send and receive multimedia streams via the real-time media servers 212, but they may also communicate with the network services servers 214 as needed during meetings. For example, if the meeting host leaves the meeting, the network services servers 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services servers 214.

For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services servers 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services servers 214 may deny the request.

Depending on the functionality provided by the video conference provider, the network services servers 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these video room gateway servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway servers 216 when dedicated video conferencing hardware connects to it, such as device ID information, subscriber information, hardware capabilities, hardware version information etc. Upon receiving such information and authenticating the dedicated video conferencing hardware, the video room gateway servers 216 may interact with the network services servers 214 and real-time media servers 212 to allow the video conferencing hardware to create or join meetings hosted by the video conference provider 210.

The telephony gateway servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
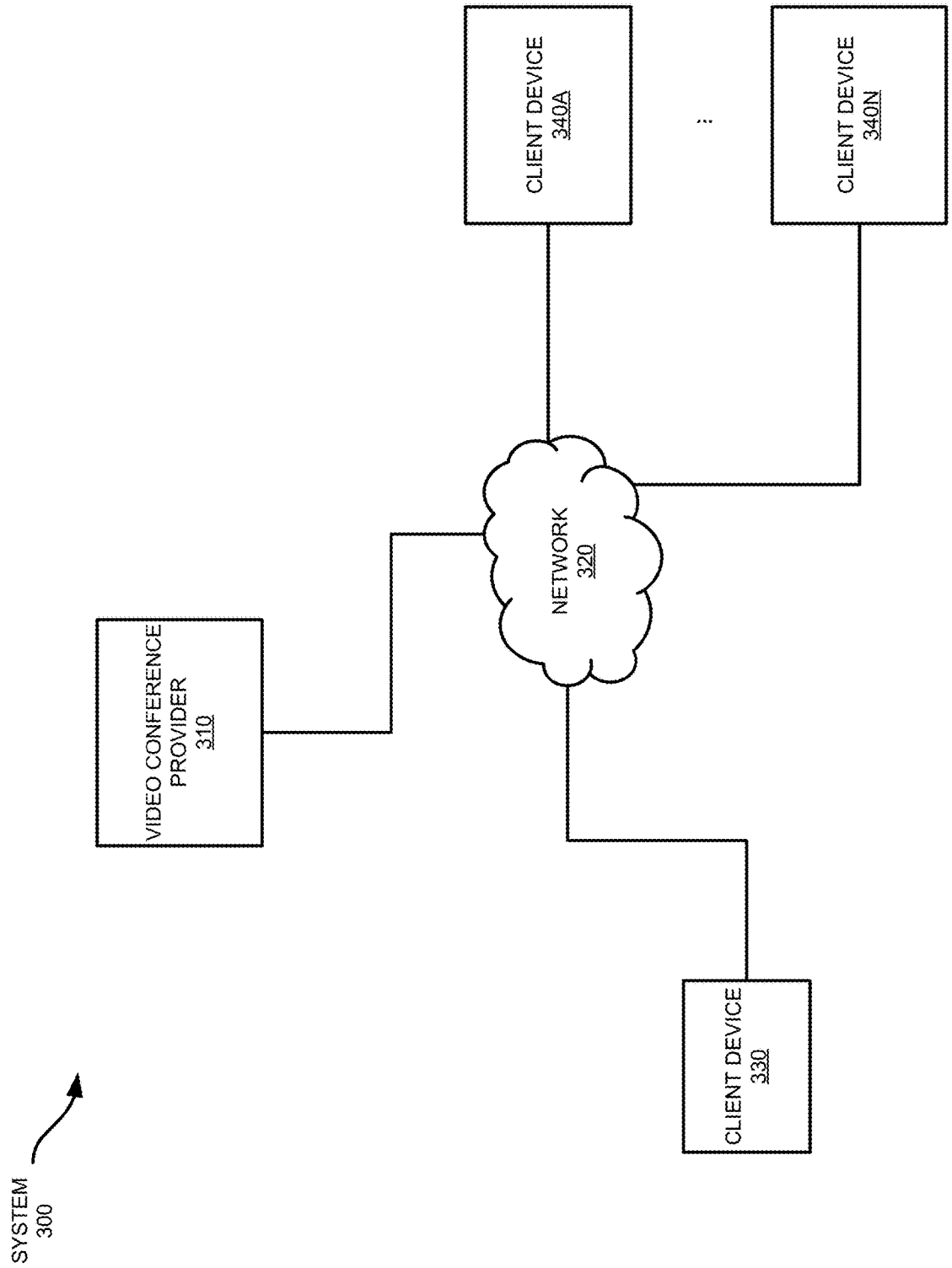
FIG. 3 depicts an example system for providing video conferences.

FIG. 3 depicts an example system 300 for providing chat bridging in video conferences. The system 300 shown in FIG. 3 includes a video conference provider 310 and multiple client devices 330 and 340A-N that are connected to the video conference provider 310 via network 320. In this example, the network 320 is the internet; however, any communications network or combination of communications networks may be employed. While system 300 is depicted as including multiple client device 330, 340A-N, it should be appreciated that some example systems may not include any client devices at any particular time.

To start a meeting, the client device 330, acting as a host, connects to the video conference provider 310 and begins a main meeting ("meeting") at the video conference provider 310, such as by beginning a scheduled meeting, generally as described above with respect to FIGS. 1 and 2. The video conference provider 310 may create and manage the meeting as discussed above. Any of client devices 330, or 340A-N may start or join additional meetings.

System 300 can implement chat bridging functionality as described herein. For example, client devices 330 or 340A-N can join or host video conferencing sessions and can execute one or more agents (not depicted). In turn, the agents can join messaging channels of the host video conferencing sessions. In some cases, the video conferencing sessions can be hosted elsewhere, for example, on one or more servers at the video conference provider 310, and the agents may join a session via one or more of the client devices 330 or 340A-N. In some examples the video conference provider 310 may execute one or more agents instead of, or in addition to, agents executed by the client device 330, 340A-N. Additionally, one or more components of system 300 can implement the bridging application, which can perform intermediate processing on messages.

For example, once the client devices have joined their respective meetings, the agents can obtain chat messages exchanged within meetings and provide them to a bridging application, such as one hosted by the video conference provider 310. The chat bridging application can then filter and distribute the chat messages to other meetings to be posted in their respective chats, such as by sending the messages to agents connected to those meetings and identifying the participant who initially posted the message.

After receiving a message from the bridging application, an agent can change its apparent identity to match that of the original poster of the message. The agent can then post the message to the chat session in its meeting using the apparent identity. Thus, the message will appear to have originated from the participant who originally posted the message in the other meeting. As a result, participants in the meeting will be able to see chat messages from another meeting and the identity of the participant(s) who originally posted the messages.

Figure 4:
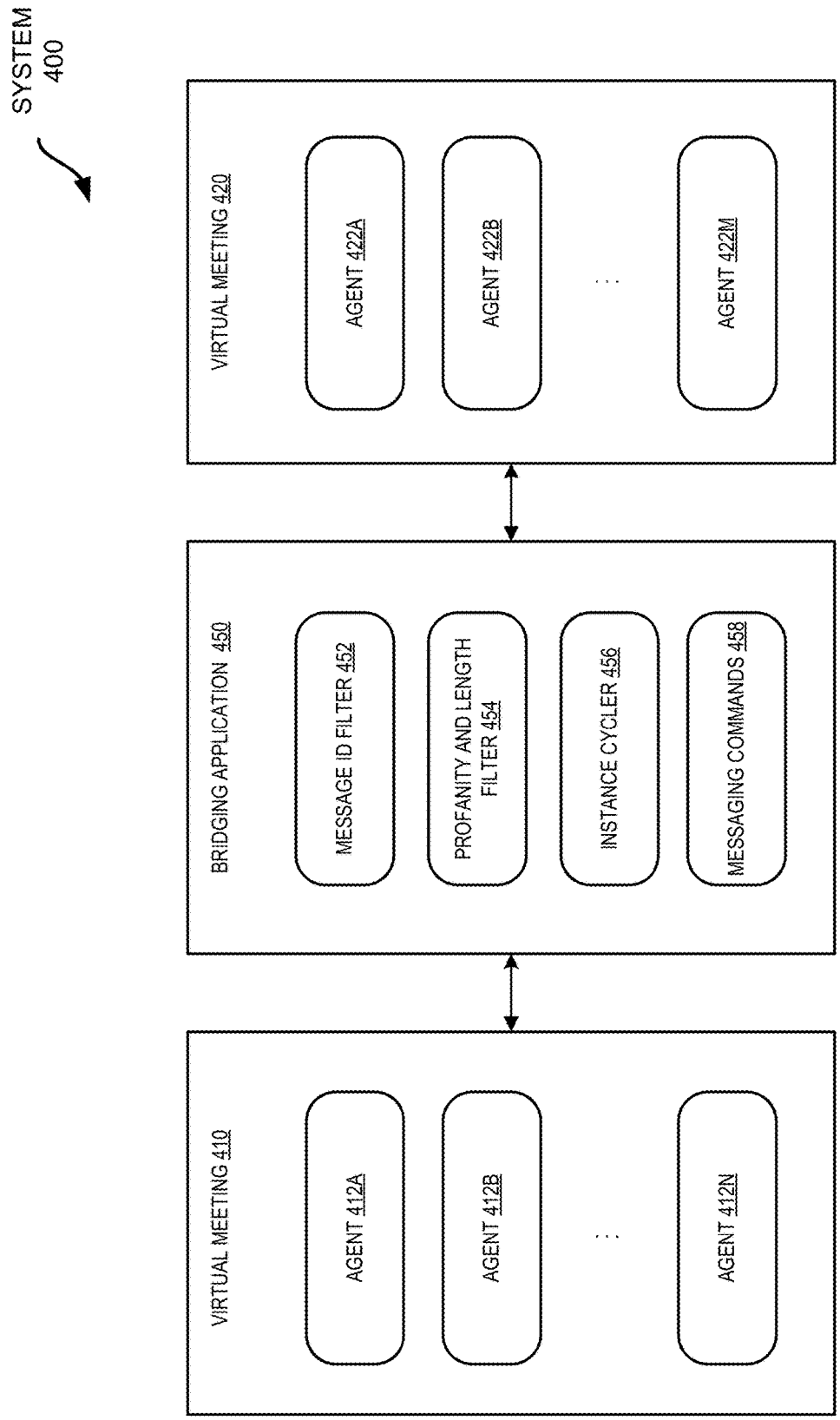
FIG. 4 depicts an example system for bridging messaging between video conferences.

FIG. 4 depicts an example system 400 for chat bridging in video conferences. System 400 includes agents 412A-N in virtual meeting 410, bridging application 450, and agents 422A-M in virtual meeting 420. In the example depicted, bridging application 450, in conjunction with virtual agents (listeners) 412A-N, 422A-M that join virtual meeting 410 and virtual meeting 420, bridges messaging channels between virtual meeting 410 and virtual meeting 420. Bridging can include cross-posting messages between virtual meetings, filtering content for profanity and length, and updating an identity of the one or more virtual agents.

While two virtual meetings 410 and 420 are depicted in system 400, it will be appreciated that system 400 can bridge messaging channels of any number of meetings. Further, the functionality of virtual meeting 410, bridging application 450, virtual meeting 420, and associated agents, can be implemented on a single client device, e.g., client devices 330 and 440A-N, on multiple client devices, and/or on one or more server devices, such as the video conference provider 310.

As depicted, one or more agents 412A-N can join virtual meeting 410 and one or more agents 422A-M can join virtual meeting 420. Agents are implemented in software and are able to join or leave meetings as an ordinary user or client would. Each agent can join a virtual meeting by use of an interface such as an Application Programming Interface (API). Agents can each have an identity that can appear in the messaging channel or in a list of participants. For example, in some cases an agent may be identified to other users as an "Agent." In some examples, agents may be hidden from the other participants so they do not serve as a distraction. In other cases, an agent may change its identity, for example to "Sam," for message cross-posting purposes so that messages appear to originate with the original poster, rather than an agent. While agents are used herein for discussion purposes, other approaches to accessing messages in messaging channels of video conferences can be employed.

In one example, an organization configures virtual meeting 410 as a first session (e.g., for panelists and presenters) and configures virtual meeting 420 as a second session (e.g., for remote attendees). Bridging of the messaging channels of virtual meeting 410 and virtual meeting 420 is desired. Agent 412A joins virtual meeting 410 and listens for messages. Upon detecting a message from a first user, one of the agent's assigned users, agent 412A passes the message to bridging application 450. Bridging application 450 propagates the message to agent 422A, which in turn posts the message in virtual meeting 420. Similarly, agent 422A joins virtual meeting 420 and, upon detecting a message from a user associated with it, the agent 422A passes the message to the bridging application 450, which propagates the message to agent 412A, which in turn posts the message in virtual meeting 420.

In some cases, bridging application 450 implements additional functionality related to message bridging. As depicted, bridging application 450 includes message ID filter 452, profanity and length filter 454, instance cycler 456, messaging commands 458. This functionality can be used selectively or not at all.

Message ID filter 452 can filter messages identified for cross-posting based on one or more criteria. For example, message filtering can be performed based on an identifier (ID) of the user or participant in the conference. It may be desirable that the messages from certain users are not propagated. For example, messages from certain designated users such as panelists who are speaking among themselves would be disruptive if propagated to a wider audience. Similarly, messages from agents should not be propagated.

Further, message ID filter 452 can filter messages to ensure that messages are not cross-posted more than once. This type of filtering can be based on a message sent list. For instance, when a message is captured by an agent, the message can added to a sent list such that the message is not propagated a second time and does not bounce back and forth between the virtual meetings. Accordingly, messages that have already been cross-posted can be ignored.

In another example, filtering is performed such that an individual agent only listens for messages from users that are assigned to that agent. For instance, if a given virtual meeting has 100 users and five agents are assigned to cover the messages posted by the users, then each agent can handle messages from a predetermined twenty users.

Profanity and length filter 454 can filter incoming messages to remove profanity or objectionable content. Algorithmic or predictive approaches can be used. For example, a known word list can be used to check whether any known offensive words are in a message. In some cases, one or more predictive or machine learning models. Examples of suitable models include predictive models and classifiers (e.g., linear classifiers, support vector machines (SVM), decision trees, k-nearest neighbor models, and random forest models). The models are used for identifying and/or removing inappropriate or harmful content in messages. In some cases, an external profanity filtering service or API can be used.

Profanity and length filter 454 can also filter messages based on length. Messages that are too long can be disruptive. Accordingly, if an incoming message is greater than a threshold length, then action can be taken such as not propagating the message further or truncating the message to be within the threshold length. Additional filtering is possible.

Instance cycler 456 ensures a constant flow of agents into the meetings. For example, when a first agent has passed the message to the bridging application 450, the agent may then be reassigned to identify messages from another user. The number of agents can be adjusted as needed to ensure real-time operation. Agents can be reassigned in a round robin or other basis.

Messaging commands 458 can issue commands to the agents. An example of a command is the rename command, which causes an agent to rename itself. For instance, when joined to the meeting, the agent can have an identity as represented by a name and/or a user interface element such as an icon next to the corresponding message, and/or a name in a participants list, as discussed further with respect to FIGS. 6 and 7. The identity can be dynamic in that the identity can change as the agent joins or leaves meetings and as messages are cross-posted from one meeting to another. Therefore, if agent 422B joins virtual meeting 420 to cross-post a message, the identity of agent 422B may be initially set as "Agent" but is later updated when cross-posting a message to reflect the identity of the original poster of the message.

Figure 5:
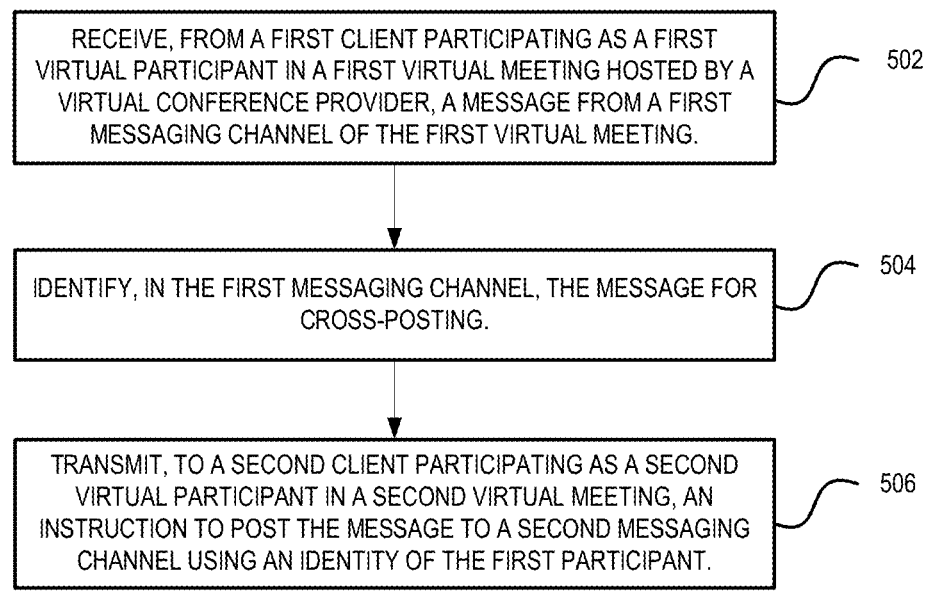
FIG. 5 depicts a flowchart of an example of a method for bridging messaging channels between video conferences.

FIG. 5 depicts a flowchart of an example of a method for chat bridging in video conferences. Method 500 can be implemented by one or more of video conference provider 310, client devices 340A-N, or any other systems.

It should be appreciated that method 500 provides a particular method for bridging messaging channels between video conferences. Other sequences of operations may also be performed according to alternative examples. For example, alternative examples of the present invention may perform the steps outlined above in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices. For instance, an application may transmit directly to a video conference provider and/or via a client software. One of ordinary skill in the art would recognize many variations, modifications, and alternatives.

At block 502, method 500 involves receiving, from a first client participating as a first virtual participant in a first virtual meeting hosted by a virtual conference provider, a message from a first messaging channel of the first virtual meeting. For example, an agent 412A executing on a client device 340A is participating as a first virtual participant in a first virtual meeting hosted by video conference provider 310. The agent 412A sends a message to a bridging application 450. The bridging application 450 can execute on a client device or a server device such as at the video conference provider 310. The first virtual meeting 410 has a first set of participants and has a first messaging channel that enables text messaging between the first set of participants. In addition, the agent 412A joins the meeting and is able to interact with the first message channel. A first participant of the first set of participants posts a message. Agent 412A can then receive the message from the chat channel.

At block 504, method 500 involves identifying, in the first messaging channel, the message for cross-posting. Continuing the example, the agent 412A identifies a candidate message for cross-posting.

As discussed, the bridging application 450 can filter a message identified by an agent 412A to ensure that the identified message is suitable. Some messages are suitable for cross-posting whereas other messages are not suitable. As discussed with respect to FIG. 4, a particular agent may be configured to listen only for messages from a subset of users. For example, the first set of participants can include a subset of participants for which a particular agent is responsible. For example, if the first set of participants has ten users, then a first agent may be responsible for messages for two of the users, and so forth. If the first user is not in the subset, then the message is not identified for cross-posting by that agent; however, a different agent associated with the first user may identify the message for cross-posting. Accordingly, identifying a message for cross-posting can include verifying that the first participant is within an associated subset of participants of the first virtual participants.

In some cases, identifying a message for cross-posting can involve performing additional processing, such as by an agent 412A-N, agent 422A-M, or the bridging application 450. For example, filtering for profanity, obscenity, inappropriateness, or harmfulness can be performed. Accordingly, identifying a message for cross-posting can include identifying text that is inappropriate or harmful in the message. Based on the identifying, the text can be removed from the message as appropriate.

In some cases, filtering for length can be performed. Accordingly, identifying a message for cross-posting can include identifying that the message has a length that exceeds a length threshold. If the message exceeds the threshold, then the message can be adjusted to satisfy the length threshold. In some cases, such a message can not be cross-posted.

In some cases, filtering is performed to ensure that messages identified for cross-posting originate from a participant of a meeting and are not themselves cross-posted from another meeting by an agent. As discussed with respect to FIG. 4, this can be performed using a sent list.

At block 506, method 500 involves transmitting, to a second client participating as a second virtual participant in a second virtual meeting, an instruction to post the message to a second messaging channel using an identity of the first participant. Continuing the example, second agent 422A executed by client device 340B is participating as a second virtual participant in a second virtual meeting hosted by video conference provider 310. The second virtual meeting has a second set of participants and has a second messaging channel that provides text messaging between the second set of participants. Upon receiving the instruction, the second agent 422A posts the message in the second messaging channel.

In some cases, the instruction to post the message causes the virtual conference provider to update an original identity, such as by changing the agent's identity from "Agent" to the identity of the first virtual participant from the first messaging channel.

Cross-posting can continue in one or both directions between the virtual meetings. For example, cross posting can include receiving an additional message from the second client from the second messaging channel. The additional message is identified for cross posting, as described above with respect to block 504. Then, an additional instruction is transmitted to the first client to post the additional message to the first messaging channel using an identity of the additional participant.

Figure 6:
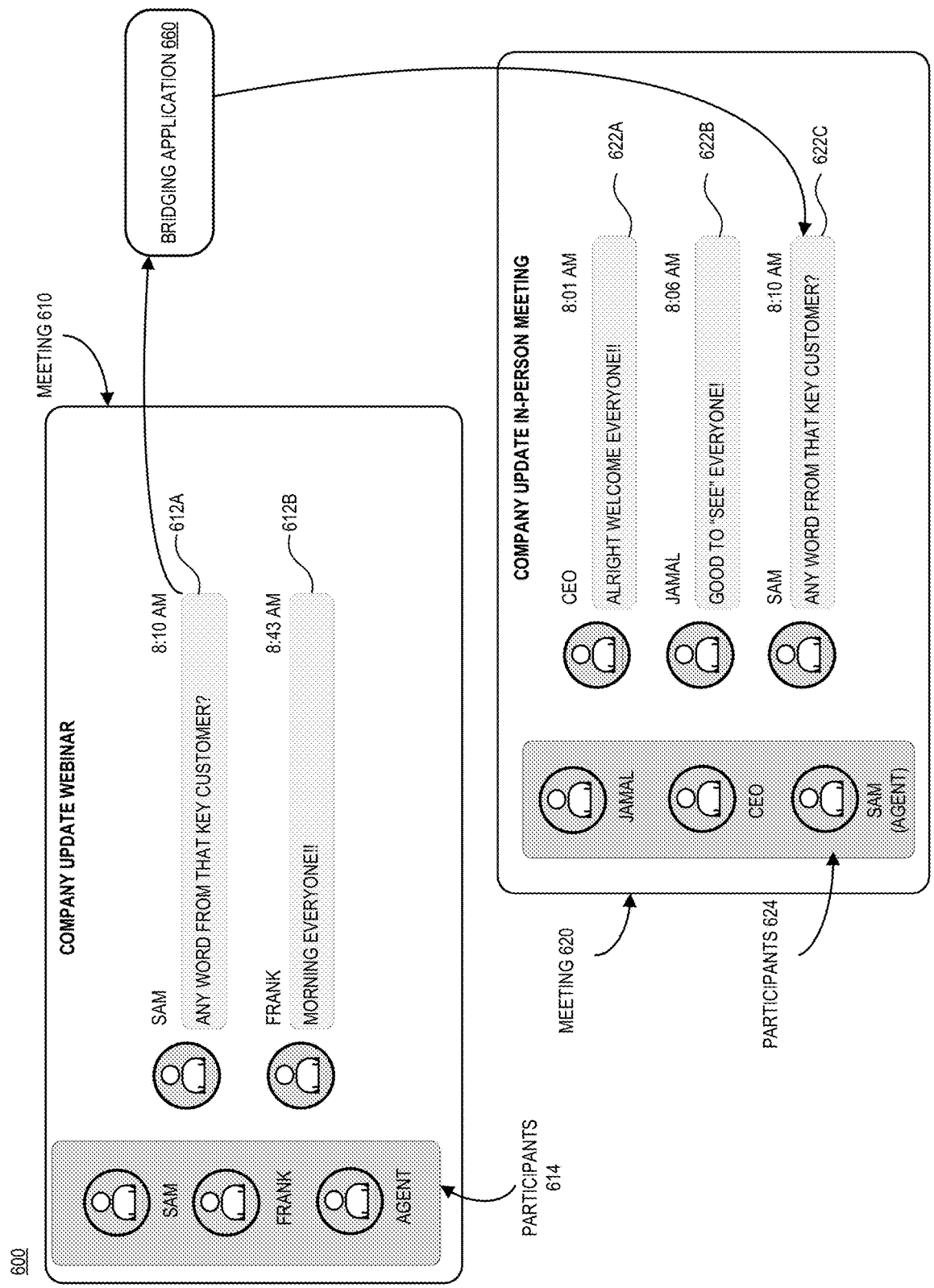
FIG. 6 depicts an example of bridging messaging between video conferences.

FIG. 6 depicts an example 600 of chat bridging in video conferences. Example 600 includes a first virtual meeting 610, a second virtual meeting 620, and bridging application 660. In example 600, bridging application 660 in conjunction with two listeners, propagates a message from first virtual meeting 610 to a second virtual meeting 620.

In the example depicted, first virtual meeting 610 includes messages 612A-B sent by one or more of participants 614. As can be seen, participants 614 includes "Sam," "Frank," and "Agent." Agent is a first virtual agent that joined first virtual meeting 610 to listen for messages. The first virtual agent identifies Sam's message "Any word from that key customer?" Virtual meeting 620 includes messages 622A-B sent by one or more of participants 624.

Continuing the example, the first agent propagates Sam's message to bridging application 660, in which various filtering and other operations can be performed as discussed with respect to system 400 of FIG. 4. Bridging application 660 propagates Sam's message to a second agent, which has joined second virtual meeting 620. The second virtual agent renames itself from "Agent" to "Sam" such that Sam's propagated message appears to be from Sam and that the participants list includes "Sam." Though in some examples, the agent's identity may not be visible in the participant list.

Figure 7:
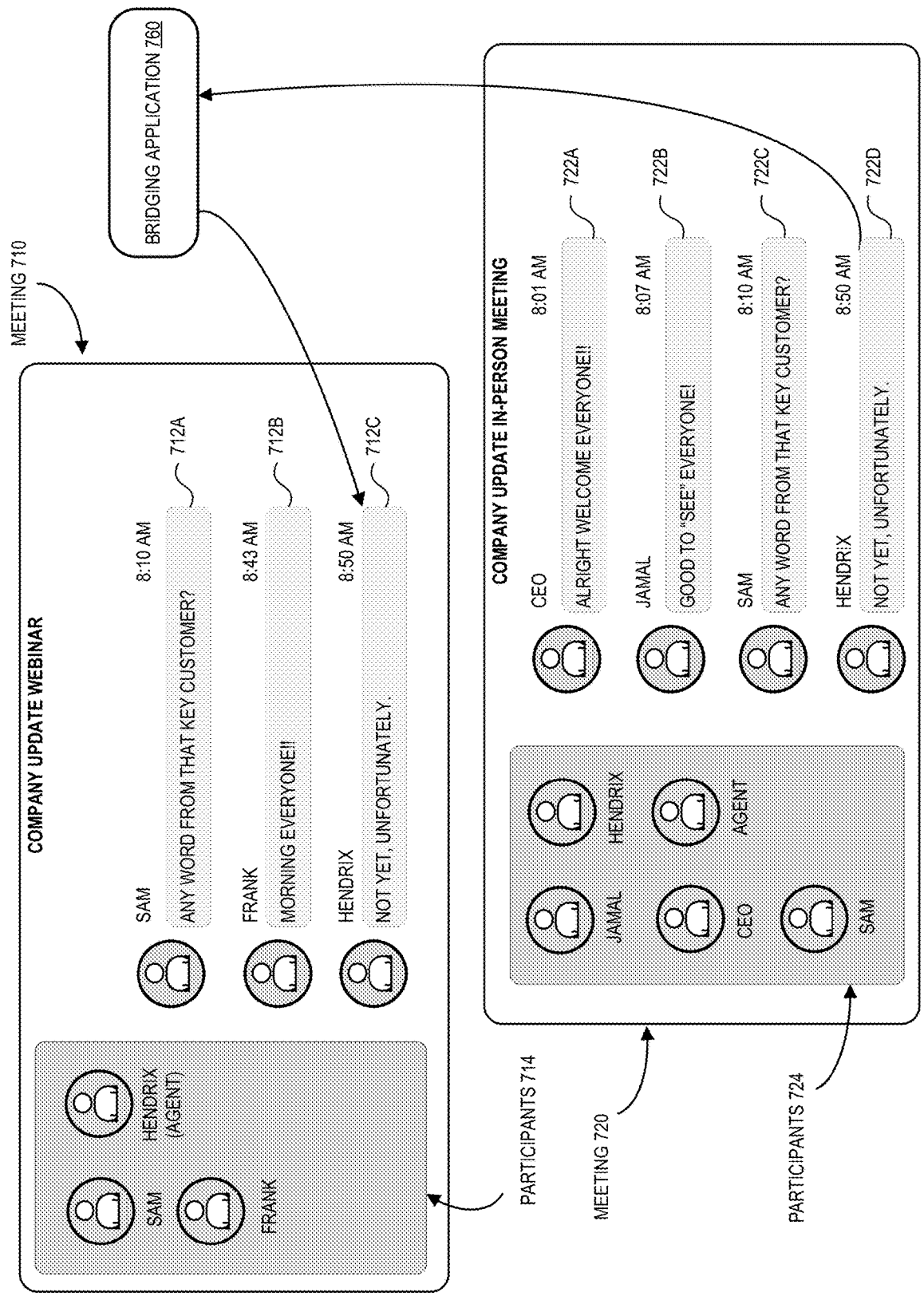
FIG. 7 depicts an example of bridging messaging between video conferences.

FIG. 7 depicts an example 700 of bridging messaging between video conferences. Example 700 includes a first virtual meeting 710, a second virtual meeting 720, and bridging application 760. In example 700, bridging application 660 in conjunction with two listeners, propagates a message from second virtual meeting 720 to a first virtual meeting 710.

As can be seen, first virtual meeting 710 includes messages 712A-C from participants 714 and second virtual meeting 720 includes various messages 722A-D from participants 724. An agent joins second virtual meeting 720 as a participant "Agent" as reflected in participants 724. The agent identifies the message 722D from "Hendrix" that is "Not yet, unfortunately." The agent passes message 722D to bridging application 760, which in turn passes the message to another agent that has joined the first virtual meeting 710. As can be seen, the agent is renamed to "Hendrix" as a participant and the message is output as message 712C.

Figure 8:
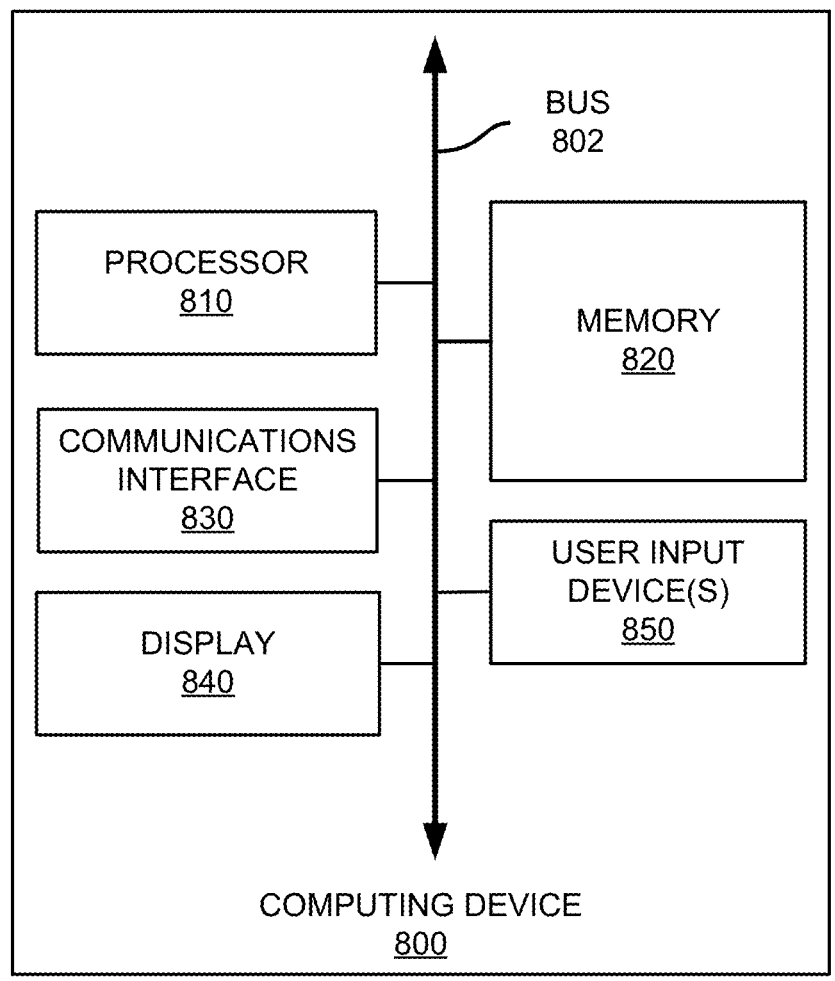
FIG. 8 illustrates an example computing device for bridging messaging between video conferences.

FIG. 8 illustrates an example computing device 800 for bridging messaging between video conferences. Computing device 800 is suitable for use in example systems or methods described herein. Computing device 800 includes a processor 810 which is in communication with the memory 820 and other components of the computing device 800 using one or more communications buses 802.

The processor 810 is configured to execute computer-executable instructions stored in the memory 820 to perform one or more methods described herein, such as part or all of the method, described above. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store computer-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with computer-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Illustration 1 is a method including: receiving, from a first client participating as a first virtual participant in a first virtual meeting of a plurality of virtual meetings hosted by a virtual conference provider, a message from a first messaging channel of the first virtual meeting, wherein: the first virtual meeting has a first plurality of participants and the first messaging channel, the first messaging channel provides text messaging between the first plurality of participants, and the message was posted by a first participant of the first plurality of participants; identifying, in the first messaging channel, the message for cross-posting; and transmitting, to a second client participating as a second virtual participant in a second virtual meeting of the plurality of virtual meetings, an instruction to post the message to a second messaging channel using an identity of the first participant, wherein: the second virtual meeting has a second plurality of participants and the second messaging channel, and the second messaging channel provides text messaging between the second plurality of participants.

Illustration 2 is the method of any previous or subsequent illustration, wherein identifying the message for cross-posting includes verifying that the first participant is within a subset of the first plurality of participants.

Illustration 3 is the method of any previous or subsequent illustration, further including: receiving, from the second client, an additional message from the second messaging channel, wherein the additional message was posted by an additional participant of the second plurality of participants; identifying, in the second messaging channel, the additional message for cross-posting; and transmitting, to the first client, an additional instruction to post the additional message to the first messaging channel using an identity of the additional participant.

Illustration 4 is the method of any previous or subsequent illustration, further including: receiving, from the first client, an additional message; identifying, in the first messaging channel, the additional message for cross-posting; determining that the additional message originated in the second messaging channel; and responsive to determining that the additional message originated in the second messaging channel, ignoring the message.

Illustration 5 is the method of any previous or subsequent illustration, wherein the instruction to post the message causes the virtual conference provider to update an original identity to the identity of the first participant.

Illustration 6 is the method of any previous or subsequent illustration, further including: identifying, in the message, text that is inappropriate or harmful; and responsive to the identifying, removing the text from the message.

Illustration 7 is the method of any previous or subsequent illustration, further including: identifying that the message has a length that exceeds a length threshold; and adjusting the message to satisfy the length threshold.

The above examples may be implemented on a system including a processor and/or on a non-transitory computer-readable medium. These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

That which is claimed is:
1. A method comprising:
executing and connecting, by a virtual conference provider, a first agent process to a first virtual meeting of a plurality of virtual meetings hosted by a virtual conference provider, the first agent process connected as a participant in the first virtual meeting;
executing and connecting, by the virtual conference provider, a second agent process to a second virtual meeting of the plurality of virtual meetings hosted by the virtual conference provider, the second agent process connected as a participant in the second virtual meeting;
receiving, from the first agent process, a message from a first messaging channel of the first virtual meeting, the message posted by a first participant of a first plurality of participants in the first virtual meeting the first messaging channel providing text messaging between the first plurality of participants in the first virtual meeting;

identifying, by the virtual conference provider, the message for cross-posting;
transmitting, to the second agent process, an instruction to post the message to a second messaging channel of the second virtual meeting using an identity of the first participant, the second messaging channel providing text messaging between a second plurality of participants of the second virtual meeting;
receiving, from the first agent process, an additional message;
identifying the additional message for cross-posting;
determining that the additional message originated in the second messaging channel; and
responsive to determining that the additional message originated in the second messaging channel, ignoring the message.

2. The method of claim 1, wherein identifying the message for cross-posting comprises verifying that the message was posted to the first messaging channel by a first participant is within the first plurality of participants.

3. The method of claim 1, further comprising:
receiving, from the second agent process, an additional message from the second messaging channel, wherein the additional message was posted by an additional participant of the second plurality of participants;
identifying the additional message for cross-posting; and
transmitting, to the first agent process, an additional instruction to post the additional message to the first messaging channel using an identity of the additional participant.

4. The method of claim 1, wherein the instruction to post the message causes the virtual conference provider to update an original identity to the identity of the first participant.

5. The method of claim 1, further comprising:
identifying, in the message, text that is inappropriate or harmful; and
responsive to the identifying, removing the text from the message.

6. The method of claim 1, further comprising:
identifying that the message has a length that exceeds a length threshold; and
adjusting the message to satisfy the length threshold.

7. The method of claim 1, wherein transmitting the instruction comprises transmitting a further instruction to the second agent process to change its apparent identity to the first participant.

8. A system for comprising:
a non-transitory computer-readable medium storing processor-executable program instructions; and
one or more processors communicatively coupled to the non-transitory computer-readable medium, the one or more processors configured to execute the processor-executable program instructions to:
execute and connect, by a virtual conference provider, a first agent process to a first virtual meeting of a plurality of virtual meetings hosted by a virtual conference provider, the first agent process connected as a participant in the first virtual meeting;
execute and connect, by the virtual conference provider, a second agent process to a second virtual meeting of the plurality of virtual meetings hosted by the virtual conference provider, the second agent process connected as a participant in the second virtual meeting;
receive, from the first agent process, a message from a first messaging channel of the first virtual meeting, the message posted by a first participant of a first plurality of participants in the first virtual meeting the first messaging channel providing text messaging between the first plurality of participants in the first virtual meeting;
identify, by the virtual conference provider, the message for cross-posting;
transmit, to the second agent process, an instruction to post the message to a second messaging channel of the second virtual meeting using an identity of the first participant, the second messaging channel providing text messaging between a second plurality of participants of the second virtual meeting;
receive, from the first agent process, an additional message;
identify the additional message for cross-posting;
determine that the additional message originated in the second messaging channel; and
responsive to determining that the additional message originated in the second messaging channel, ignore the message.

9. The system of claim 8, wherein the one or more processors are configured to execute further processor-executable program instructions to verify that the message was posted to the first messaging channel by a first participant is within the first plurality of participants.

10. The system of claim 8, wherein the one or more processors are configured to execute further processor-executable program instructions to:
receive, from the second agent process, an additional message from the second messaging channel, wherein the additional message was posted by an additional participant of the second plurality of participants;
identify the additional message for cross-posting; and
transmit, to the first agent process, an additional instruction to post the additional message to the first messaging channel using an identity of the additional participant.

11. The system of claim 8, wherein the one or more processors are configured to execute further processor-executable program instructions to update an original identity to the identity of the first participant.

12. The system of claim 8, wherein the one or more processors are configured to execute further processor-executable program instructions to:
identify, in the message, text that is inappropriate or harmful; and
responsive to the identifying, remove the text from the message.

13. A non-transitory computer-readable medium comprising processor-executable instructions configured to cause one or more processors to:
execute and connect, by a virtual conference provider, a first agent process to a first virtual meeting of a plurality of virtual meetings hosted by a virtual conference provider, the first agent process connected as a participant in the first virtual meeting;
execute and connect, by the virtual conference provider, a second agent process to a second virtual meeting of the plurality of virtual meetings hosted by the virtual conference provider, the second agent process connected as a participant in the second virtual meeting;
receive, from the first agent process, a message from a first messaging channel of the first virtual meeting, the message posted by a first participant of a first plurality of participants in the first virtual meeting the first messaging channel providing text messaging between the first plurality of participants in the first virtual meeting;

identify, by the virtual conference provider, the message for cross-posting;

transmit, to the second agent process, an instruction to post the message to a second messaging channel of the second virtual meeting using an identity of the first participant, the second messaging channel providing text messaging between a second plurality of participants of the second virtual meeting;

receive, from the first agent process, an additional message;

identify the additional message for cross-posting;

determine that the additional message originated in the second messaging channel; and responsive to determining that the additional message originated in the second messaging channel, ignore the message.

14. The non-transitory computer-readable medium of claim 13, further comprising processor-executable instructions configured to cause the one or more processors to verify that the message was posted to the first messaging channel by a first participant is within the first plurality of participants.

15. The non-transitory computer-readable medium of claim 13, further comprising processor-executable instructions configured to cause the one or more processors to:

receive, from the second agent process, an additional message from the second messaging channel, wherein the additional message was posted by an additional participant of the second plurality of participants;

identify, in the second messaging channel, the additional message for cross-posting; and transmit, to the first agent process, an additional instruction to post the additional message to the first messaging channel using an identity of the additional participant.

16. The non-transitory computer-readable medium of claim 13, further comprising processor-executable instructions configured to cause the one or more processors to update an original identity to the identity of the first participant.

17. The non-transitory computer-readable medium of claim 13, further comprising processor-executable instructions configured to cause the one or more processors to:

identify, in the message, text that is inappropriate or harmful; and responsive to the identifying, remove the text from the message.

18. The non-transitory computer-readable medium of claim 13, further comprising processor-executable instructions configured to cause the one or more processors to:

identify that the message has a length that exceeds a length threshold; and adjust the message to satisfy the length threshold.

\* \* \* \* \*